United States Patent [19]
Kigel et al.

[11] Patent Number: 5,830,388
[45] Date of Patent: Nov. 3, 1998

[54] COAGULATING AND FLOCCULATING AGENT AND METHOD FOR MAKING IT

[75] Inventors: Mark Y. Kigel, Brunswick, N.J.; Mikhail Kofman, New York, N.Y.; Mikhail Faylond; Tamara V. Vyshkina, both of Brooklyn, N.Y.

[73] Assignee: American EnviroCare, Inc., East Brunswick, N.J.

[21] Appl. No.: 741,383

[22] Filed: Oct. 29, 1996

Related U.S. Application Data

[63] Continuation-in-part of Ser. No. 514,187, Aug. 11, 1995, abandoned.

[51] Int. Cl.$^6$ .................................................. B01D 17/00
[52] U.S. Cl. ......................... 252/358; 252/323; 252/324; 252/179; 210/705; 210/723; 210/728
[58] Field of Search .................................... 252/323, 324, 252/329, 330, 358, 175, 179; 210/705, 723, 728; 501/146; 423/472

[56] References Cited

U.S. PATENT DOCUMENTS

| | | | |
|---|---|---|---|
| 2,362,022 | 11/1944 | Olin | 252/175 |
| 2,858,269 | 10/1958 | Harwood et al. | 210/702 |
| 3,544,476 | 12/1970 | Aiba et al. | 252/175 |
| 3,891,745 | 6/1975 | Bellan et al. | 423/462 |
| 3,909,439 | 9/1975 | Rivola et al. | 423/472 |
| 3,989,805 | 11/1976 | Notari et al. | 423/462 |
| 4,024,087 | 5/1977 | Lainer et al. | 252/179 |
| 4,069,299 | 1/1978 | Hodgson | 423/462 |
| 4,435,308 | 3/1984 | Thomas et al. | 252/181 |
| 4,566,986 | 1/1986 | Waldmann | 252/175 |
| 4,654,201 | 3/1987 | Carlsson | 423/128 |
| 4,795,585 | 1/1989 | Becker | 210/723 |
| 4,981,673 | 1/1991 | Boutin et al. | 423/467 |
| 5,110,363 | 5/1992 | Clarke et al. | 210/716 |
| 5,124,139 | 6/1992 | Colvin et al. | 423/467 |
| 5,246,686 | 9/1993 | Cuer et al. | 423/467 |
| 5,282,974 | 2/1994 | Hart | 210/708 |
| 5,358,694 | 10/1994 | Giovanniello et al. | 423/462 |
| 5,453,200 | 9/1995 | Weiss et al. | 210/639 |

FOREIGN PATENT DOCUMENTS 119870  11/1959  Russian Federation .

OTHER PUBLICATIONS

Chem. Abstr., vol. 81, No. 8, Aug. 26, 1974 (Columbus OH, USA) p. 132, Columnn 1, the abstract No. 81:39538, Plyshevskii, Yu. S., et al., 'Production of a purified flocculant from nepheline'Tr. Ural. Nauch.–Issled. Khim. Inst. (1973), No. 24, 99–103 (R.

Chem. Abstr., vol. 109, No. 16, Oct. 17, 1988 (Columbus OH, USA) p. 145, column 2, the abstract No. 109:131675, ZAKHAROV V. I. et al., 'Manufacture of aluminum–containing coagulant', SU 1399268–A2 880530 (Russ).

HAWLEY"S Condensed Chemical Dictionary, (Van Nostrand Reinhold Company, Inc., NY, NY, Dec. 1987) pp. 288, 1248–1249. (month unknown).

*Primary Examiner*—Richard D. Lovering
*Assistant Examiner*—Daniel S. Metzmaier
*Attorney, Agent, or Firm*—Robert L. Stone

[57] ABSTRACT

A coagulating and flocculating agent based on aluminum pentahydroxychloride for purifying and treating water and/or waste water and/or sludge and/or other contaminated liquids as well as to separate suspended and colloidal particles from liquids in industrial manufacturing processes has its activity enhanced with an inorganic or organic flocculation enhancing additive such as natural or synthetic zeolite and/or cationic, anionic and non-ionic powdered, emulsified or liquid polyacrylamide. Aluminum pentahydroxychloride is formed by treating a natural nepheline, aluminum powder, aluminum oxide or other aluminum providing material with hydrochloric acid after which it is mixed with the flocculation enhancing additive.

10 Claims, 4 Drawing Sheets

COAGULATING AND FLOCCULATING AGENT AND METHOD FOR MAKING IT

FIELD OF THE PRESENT INVENTION

This application is a continuation-in-part of Ser. No. 08/514,187, filed Aug. 11, 1995 now abanoned.

The present invention relates to creation of new and useful coagulating and flocculating agent which may be used in water and/or waste water, and/or sludge treatment processes, and/or other contaminated liquids resulting from a variety of municipal discharges and industrial process effluents, as well as to separate suspended and colloidal particles from liquids in industrial manufacturing processes. The areas of treatment to which the new coagulating and flocculating agent may be applied are practically limitless. For exemplary purposes only a partial list of some of them includes but is not limited to: (1) potable surface water, ground water, and industrial water; (2) sewage; (3) sludge and elutriate from sludge; (4) filter backwash water; (5) industrial waste water from petroleum processing and petroleum products manufacturing and processing operations; (6) waste water from chemical, cosmetics, flavors, soap, fragrances, dyes and pharmaceutical product manufacturing and processing operations; (7) waste water from ore concentration and coal preparation operations; (8) water and waste water related to nuclear power plants; (9) waste water from metallurgical and other metal processing technologies, particularly recycling water, exhaust control wet scrubbers, flue gas absorption systems, etc.; (10) electroplating process waste streams; (11) agricultural operations; (12) soil remediation and treatment; (13) waste water from tanning operations; (14) waste water from mining operations; (15) oil, grease and fat contaminated wastes; (16) waste water from meat, corn starch, dairy products, beverages, and other food processing operations, (17) textile, leather processing, and paper mill factories waste streams, etc.

BACKGROUND AND PRIOR ART

Major processes, equipment and reagents commonly used for water and waste water treatment have been developed for so called traditional contaminants. Industrial development, new technologies and high concentration of industrial plants in restricted areas close to the significant water sources have resulted in extensive water use and discharges of insufficiently treated or even not treated waste water in the natural water bodies contaminated with non-traditional impurities which cannot be removed with traditional methods and reagents. To provide water supply meeting governmentally required or community desired drinking water quality and to meet more and more stringent waste discharge government regulations, the owners must invest substantial capital in the water and waste water treatment plants. Based on traditional technologies and reagents, such investments can be either unrealistic or become a burden on industrial production. Eventually, the increased cost of traditional water and waste water treatment facilities caused by the necessity to treat non-traditional contaminants may even adversely affect industrial development at all.

Removal of suspended solids and colloidal material from liquids, and removal of water from the sludge (thickening and dewatering) have become major problems of water/waste water treatment.

Chemicals producing floc with suspended solids and colloidal matter in water and waste water treatment processes are known. Their use can considerably reduce the time of their sedimentation in clarifiers and settlers.

Usually coagulants and flocculants have been used in the sedimentation, filtration through granular and fluidized (blanket) media, centrifugation, vacuum and pressure filtration, dissolved air flotation and other phase separation processes. Among various coagulants and flocculants, such conventional coagulants as aluminum and iron salts as well as their combinations are most widely used. To increase phase separation process efficiency, some flocculants such as activated silicic acid and polyacrylamide have been added to the coagulants.

There have been the common disadvantages of conventionally used coagulants such as aluminum sulfate (alum) [$Al_2(SO_4)_3$ or $Al_2(SO_4)_3.18H_2O$], aluminum chloride [$AlCl_3$], sodium aluminate [$Na_2Al_2O_4$ or $NaAlO_2$], ferric chloride [$FeCl_3$], ferric sulfate [$Fe_2(SO_4)_3$ or $Fe_2(SO_4)_3.9H_2O$], ferrochlorosulfate [$ClSO_4Fe$], etc. The conventional coagulants and flocculants are characterized by high level of swelling and retention of large volume of water, they are not entirely stable and tend to produce hydroxide precipitate which considerably reduce the flocculating and coagulating properties. Most aluminum and ferric basic salts cannot be readily dissolved because of hydrolytic reaction which takes place and seek to reduce the flocculating properties due to formation of hydroxide precipitate. These coagulants and flocculants do not perform well in combination with other chemical reagents of water and waste water since their efficiency depends on pH, chemical components (natural and added during treatment) of water, and temperature. The production of the conventional coagulants is relatively complicated and requires relatively long reaction time. For example, the process of production of basic salts of aluminum sulfate or aluminum chloride requires approximately 10–18 hours. These disadvantages have a pronounced effect on the cost increasing of the water, waste water and sludge treatment processes.

Various methods have been proposed to improve the coagulating and flocculating properties and the stability of conventional coagulants. One of such improvements resides in reacting aluminum sulfate with phosphoric acid. Another attempt resides in reaction of added iron into the molecule of the basic aluminum salt. Both technologies are very complex and expensive, require special equipment, long time (to 150 hours) and high pressures for process implementation making them impractical. Further, they could have an adverse impact on the quality of water and environment.

It is known that aluminum displays an amphoterism, which imposes definite limitations on aluminum sulfate usage which greatly depends on pH of water media. According to various sources, in water which has $pH \leq 3.0$–4.0, the equilibrium concentration of $Al(OH)_3$ is lower. The optimal pH range for aluminum sulfate is between pH 5.5 and pH 7.5. The optimal range of the pH for ferric sulfate is likely to be $pH \geq 9.0$–9.5.

It is also known that the major acids required for making aluminum based coagulants are sulfuric acid and hydrochloric acid whereby, from the economic point of view, hydrochloric acid is more preferable.

U.S. Pat. No. 4,566,986 describes a group of calcium, zinc and magnesium based flocculating agents usable for treating waste water and other industrial waste liquids. The major advantage of this patented means is that it results in lesser sludge volume. One of the major disadvantages of these flocculating agents is that the residual metal ions can be found in the treated effluent, thus resulting in secondary effluent contamination. Another disadvantage of the considered patented flocculating agent(s) is that the process of making polyhydroxyaluminum magnesium sulfate or polyhydroxyaluminum magnesium chloride or any other inorganic flocculating agent described takes a relatively long time, such as up to 3 hours at relatively high temperature.

Some patents have described composite coagulation and flocculation agents which contain both $Cl^-$ and $SO_4^{2-}$ ions.

U.S. Pat. No. 4,435,308 describes an aluminum hydroxychloride composition characterized by the presence of $SO_4^{2-}$ anions along with an ion of an organic acid, particularly citric acid as a flocculation enhancing additive. A drawback of this coagulating and flocculating agent is that the components the agent is made of are rather expensive, which would restrict wide use of the agent.

U.S. Pat. No. 4,024,087 describes a method of preparing a coagulant from alunite by roasting it at the temperatures as high as 520° C.–620° C. then treating with $H_2SO_4$ at 80° C.–100° C. followed by leaching and separating the final product. The method requires precise dosage of the components and cooling the intermediate products during the process. A drawback of the method are its complexity and difficulties to maintain at very high temperatures. Further, the equipment is very complicated and costly.

U.S. Pat. No. 4,654,201 describes another process for producing a composite flocculating agent from hydrochloric acid and a sulphate and aluminum hydroxide-containing sludge at 80° C. during a period up to 15 hours, whereby the sludge is obtained from a spent alkaline aluminum pickle. A major disadvantage of this process is its relatively long residence time and a raw material (sludge) which cannot be considered a reliable resource for industrial production of the flocculating agent.

U.S. Pat. No. 5,246,686, U.S. Pat. No. 5,124,139, and U.S. Pat. No. 4,981,673 each describe a group of aluminum chlorosulfate flocculating agents for which two acids, hydrochloric acid and sulfuric acid, are used. The use of two acids requires complicated process equipment and storage facilities which makes the processes described in these Patents impractical.

U.S. Pat. No. 4,069,299 describes a hydroxyaluminum chloride or sulfate polymer made of urea and aluminum chloride or sulfate. A practical drawback of this process is the use of urea which is expensive to use and is subject to limited practical availability.

U.S. Pat. No. 3,544,476 describes a coagulating agent for the treatment of an aqueous medium comprises a basic metal salts of the formula: $M_n(OH)_m X_{3n-m}$, wherein M is a tri- or more valent metal, X is Cl, $NO_3$ or $CH_3COO$, 3n is larger than m, and the basicity (m/3n×100) is about 30 to 83%, and a multivalent anion having been chemically introduced in said basic salt. A major shortcoming of this patent is inadequate basicity of the salt, caused by adding the multivalent anion because it is known that coagulants work better under basic conditions (pH 8–8.2). It is known that normally aluminum pentahydroxychloride basicity is higher than 83%. Addition of the referred coagulant which has lower basicity will inevitably lower pH of water and will require addition of alkali.

U.S. Pat. No. 3,909,439 describes aluminum chlorohydroxide by the formula: $Al_2(OH)_xCl_y$, wherein x and y range from 1 to 3.5 and 5 to 2,5 respectively. A drawback of the invention is insufficient basicity of the aluminum chlorohydroxide which will lower pH of treated water and will require addition of alkali.

U.S. Pat. No. 4,795,585 teaches that polyvinyl alcohol (PVA) can be effectively utilized as a floc conditioner during the formation of polyaluminum chloride. A disadvantage of this process is that PVA is an anionic polymer which lowers a positive charge of aluminum hydroxide floc and may result in overdosing of coagulating composition to treat water having high color and low turbidity.

U.S. Pat. No. 2,362,022 describes a process of clarifying water based on mineral sodium bentonite flocculation which is effected by ionizable substances. The process referred is a combination of initial sodium bentonite floc charged with negative dispersoids in water thus making efficiency of the referred process highly dependent on availability of negative dispersoids in water. Therefore, the process referred describes an interaction between a mineral flocculant known to the skilled in the art and water contaminants, and it is unrelated to any new flocculation and coagulation agent.

U.S. Pat. No. 2,858,269 describes a process for sludge conditioning by mixing it with a solution of a basic chloride of a trivalent metal selected from the group consisting of $R_2Cl_2(OH)_4$ and $R_2Cl(OH)_5$ and mixtures thereof wherein R is a member selected from the group consisting of aluminum, iron and chromium. The improvement of the process is based on the fact that said solution of a basic chloride of a trivalent metal is present in said mixture in an amount calculated as $Al_2O_3$, ranging from 0.5% to 4.5% of the dry solids content of the sludge. This invention relates to the process of treatment of the waste water sludge using any type of iron, aluminum or chromium quadri- and pentahydroxychlorides which could be those proposed by our invention. So the patent referred in fact is a purpose of using coagulation and flocculation means and not providing the particular coagulation and flocculation agent of the present invention.

U.S. Pat. No. 5,110,363 describes a non-toxic composition, and method, for clarification of raw sugar-containing juices. A composition consists of aluminum chloride hydroxide, lime and activated bentonite and preferably also of polymeric flocculating agent. So, again, the patent referred means a purpose of using coagulation and flocculation composition and not providing the particular coagulation and flocculation agent of the present invention.

SUMMARY OF THE INVENTION

It is an object of the present invention to provide a coagulating and flocculating agent and a method for making it using an aluminum providing source which could be an inexpensive and practically available mineral ore containing aluminum oxide such as nepheline, waste aluminum powder having an aluminum oxide content, aluminum oxide, aluminum hydroxide or other aluminum providing sources, inexpensive and practically available hydrochloric acid, and an inexpensive and practically available flocculating-enhancing additive (FEA).

It is another object to provide a coagulating and flocculating agent and a method for making it which minimizes and possibly avoids presence of residual metals in the treated effluents.

It is a further object to provide a coagulating and flocculating agent and a method for making it with desirable operating temperatures of the flocculating agent production process.

It is a further object to provide a coagulating and flocculating agent and a method for making it in relatively short periods of the agent producing process residence time.

In accordance with the objectives, the invention is a coagulating and flocculating agent and also a method for making it in which aluminum pentahydroxychloride is made from an aluminum providing source such as nepheline ore, aluminum powder, aluminum oxide or aluminum hydroxide using hydrochloric acid, with addition of a FEA, particularly zeolite.

The proposed coagulating and flocculating agent and the method for making it provide an efficient and economically effective means for treating liquids, particularly water, waste water and sludge.

The coagulating and flocculating agent is a mineral material comprising aluminum pentahydroxychloride [$Al_2(OH)_5Cl.6H_2O$] admixed with an FEA. The FEA is an aluminosilicate, that is a material wherein alumina and silica are interconnected, or a polyacrylamide based synthetic organic material. Examples of FEAs include natural zeolite, particularly clinoptilolite of the $Na_2O.Al_2O_3.xSiO_2.xH_2O$ type, or synthetic zeolite of the type available under the trademark "Purolite", such as Purolite C, or swelling bentonite of the type of sodium montmorillonite, or the like. Aluminum pentahydroxychloride is desirably produced from a nepheline (nephelite) of general type $(Na,K)(Al,Si)_2O_4$ and particularly of the type of sienite or alunite [generally $R_2O.Al_2O_3.2SiO_2$, where, for instance, $R_2O$ is $(K, Na)_2O$], or aluminum powder, or aluminum oxide.

DESCRIPTION OF THE PREFERRED EMBODIMENT

The inventive coagulating and flocculating agent and a method for making it is a process generally described by one of the following reactions wherein (1) nepheline ore and (2) aluminum oxide are the aluminum providing sources.

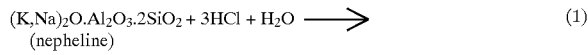
(nepheline)

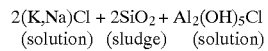

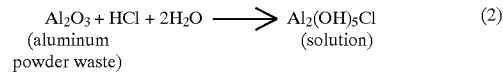

The dosage of hydrochloric acid for extracting aluminum oxide is within the range of about 20–25%, preferably about 21%–22%. Lower HCl concentration can be less efficient, while higher concentration results in undesirable extraction of K, Na, Mg and Fe from nepheline ore or waste aluminum powder waste.

The range of process temperature is about 95° C.–98° C., and the process residence time is about 7–15 minutes. Under such conditions, 50% of $Al_2O_3$ is extracted from the nepheline ore, and 60% of $Al_2O_3$ is extracted from powder aluminum waste. At a higher residence time, undesirable extraction of K, Na, Mg and Fe occurs.

Following the process of $Al_2(OH)_5Cl$ formation, the reaction product undergoes mechanical phase separation (e.g. pressure filtration) to remove $SiO_2$ containing sludge from the usable product.

The liquid phase then undergoes concentration at the temperature of 160° C.–170° C. This stage of concentration can result either in a liquid concentrate or in a solid material which further can be ground to powder.

Either form of the final product is then admixed with a FEA, preferably powdered zeolite, in a weight ratio of about 100:1 to about 100:5.

Preferably, the above coagulation and flocculating agent is used for water and waste water clarification.

The following example and tests illustrate the invention.

EXAMPLE 1

Figure 1:
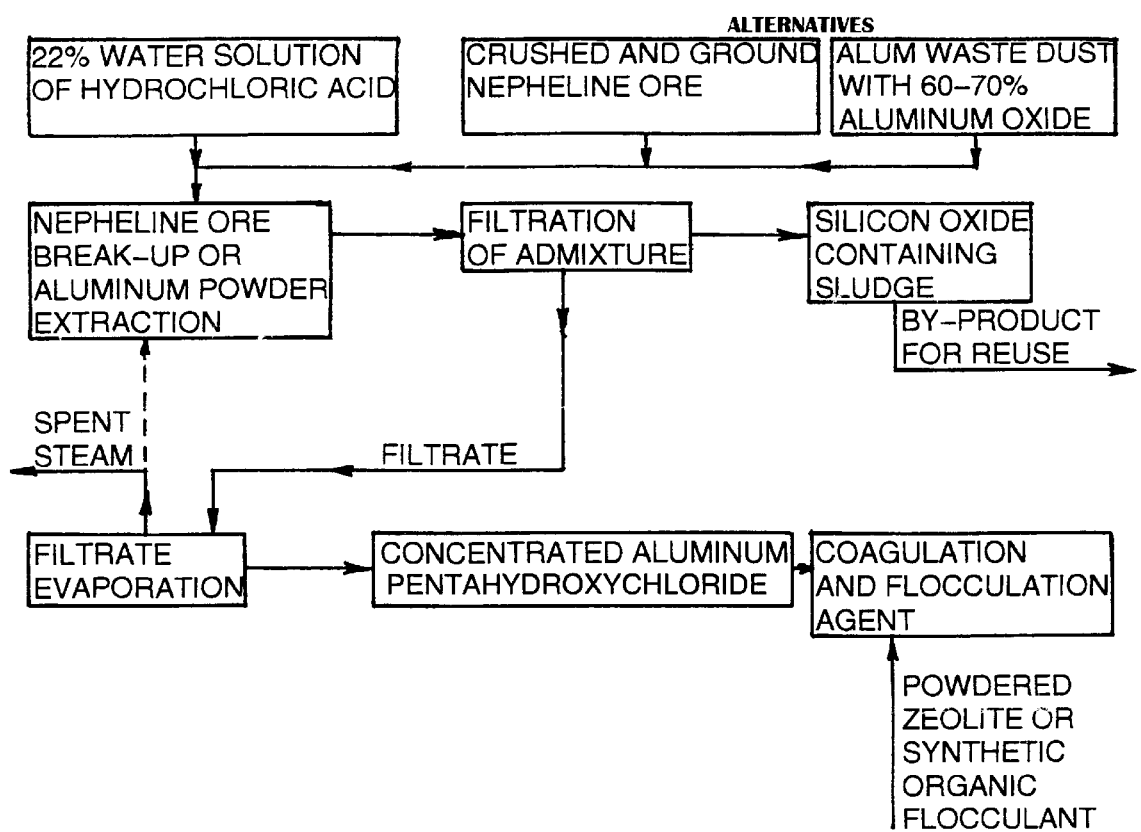
FIG. 1 is a schematic of the aluminum pentahydroxychloride production process from nepheline ore, or aluminum powder waste containing 70% aluminum oxide, or aluminum oxide, and hydrochloric acid.

Coagulation and flocculation agent containing aluminum pentahydroxychloride and zeolite is prepared with the laboratory 250-mL rotating hermetically closed autoclaves (digesters), bench-scale mixers and filtration equipment. A schematic of the flow diagram of the process is shown in FIG. 1, with nepheline as the aluminum providing source herein, particularly natural sienite as nepheline ore raw material. Its specific gravity is 2.5 g/cm³, and the content of major components as follows: $Al_2O_3$—30.5%, $SiO_2$—52.6%, K and Na—14.2%, Ca, Mg and other metals—2.7%. To optimize the major process parameters such as residence time and temperatures, in the beginning 50 mL of 18% solution of hydrochloric acid is introduced in the autoclave at 20° C., then 50 g of ground nepheline ore is added. Practically no efficient ore brake-up is noticed. Then the temperature is elevated up to 95° C., and, after processing the admixture during 45 minutes at the same strength of hydrochloric acid, the nepheline ore is broken up, the admixture is filtrated, and KCL and NaCl are found in the filtrate.

Then the test is conducted by changing the major process parameters by increments. The concentration of hydrochloric acid is elevated to 25%, the temperature is elevated to 98° C., while the residence time is decreased to 15 minutes.

The maximum output of $Al_2O_3$ (50%) at minimum KCl and NaCl content in the liquid phase is obtained with the dosage of hydrochloric acid of 21%–22%, with the reaction temperature of 95° C., and with the process residence time of 15 minutes. After filtration, the liquid phase (filtrate) is concentrated by evaporation at 160° C.–170° C. The final product is analyzed and determined to be hydrated aluminum pentahydroxychloride [$Al_2(OH)_5$]$Cl.6H_2O$. This product is admixed with ground (0.08–0.2 mm) natural clinoptilolite as zeolite in the ratio of 100:1 to 100:5 by weight. This admixture is used for comparative testing its coagulation and flocculation properties.

EXAMPLE 2

Coagulation and flocculation agent which contains aluminum pentahydroxychloride and zeolite is prepared with the above laboratory equipment using aluminum powder waste as raw material, the content of major components of the aluminum powder waste being as follows: $Al_2O_3$—70%, $SiO_2$—11.2%, K and Na—15.6%, $Fe_2O_3$—2.7%, Ca, Mg and other metals—0.5%. To optimize the major process parameters such as residence time and temperatures, in the beginning 50 mL of 21% solution of hydrochloric acid is introduced in the autoclave at 20° C., then 50 g of aluminum powder waste is added. Then the temperature is elevated to 98° C., and, after processing the admixture during 15 minutes at the same strength of hydrochloric acid, the admixture is filtrated, and KCl and NaCl are found in the filtrate. The maximum output of $Al_2O_3$ (60%) at minimum KCl and NaCl content in the liquid phase is obtained with the dosage of hydrochloric acid of 21%–22%, with the reaction temperature of 95° C., and with the process residence time of 15 minutes. After filtration, the liquid phase (filtrate) is concentrated by evaporation at 160° C.–170° C. The final product is analyzed and determined as hydrated aluminum pentahydroxychloride $[Al_2(OH)_5]Cl.6H_2O$. This product is admixed with the ground (0.08–0.2 mm) natural clinoptilolite as zeolite in the ratio of 100:1 to 100:5 by weight. This admixture is used for comparative testing its coagulation and flocculation properties.

TEST 1

Figure 2:
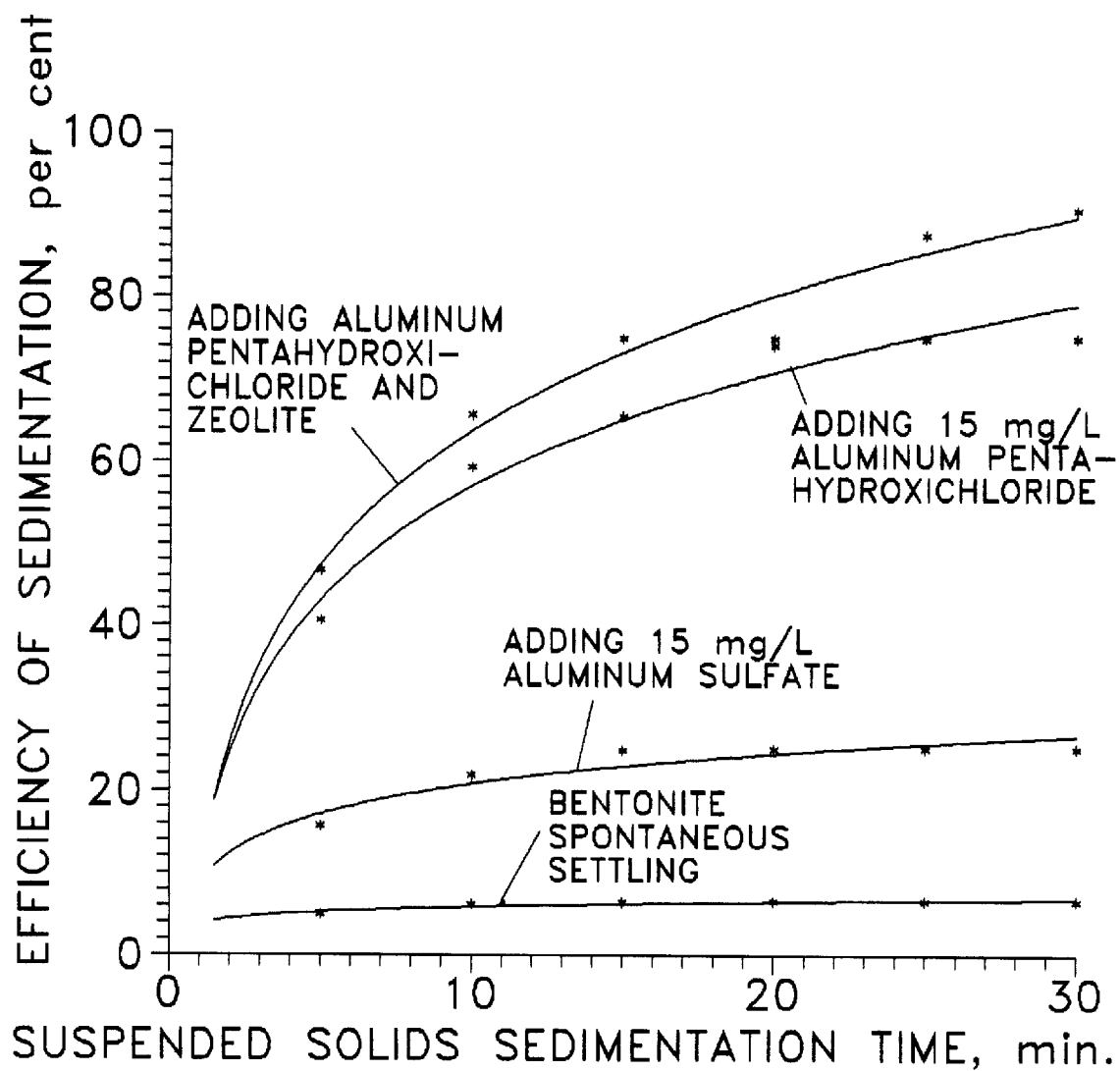
FIG. 2 is a chart which illustrates the results of comparative testing of water treatment using aluminum sulfate, aluminum pentahydroxychloride alone, and the coagulation and flocculation agent of the present invention which contains aluminum pentahydroxychloride and zeolite.

A standard jar test method is used for comparative testing of suspended solids sedimentation process using aluminum sulfate $[Al_2(SO_4)_3.18H_2O]$, aluminum pentahydroxychloride $[Al_2(OH)_5]Cl.6H_2O$, and the proposed coagulation and flocculation agent. Artificial raw water is prepared with the 5 mg/L bentonite suspension. FIG. 2 graphically illustrates the efficiency of suspended solids sedimentation vs. various reagents. The dosage of each alternative reagent is 15 mg/L. It is clear that the efficiency of water treatment using the coagulation and flocculation agent of the present invention is 12%–15% higher than that for aluminum pentahydroxychloride alone and 3.6 times higher than that for aluminum sulfate.

TEST 2

Figure 3:
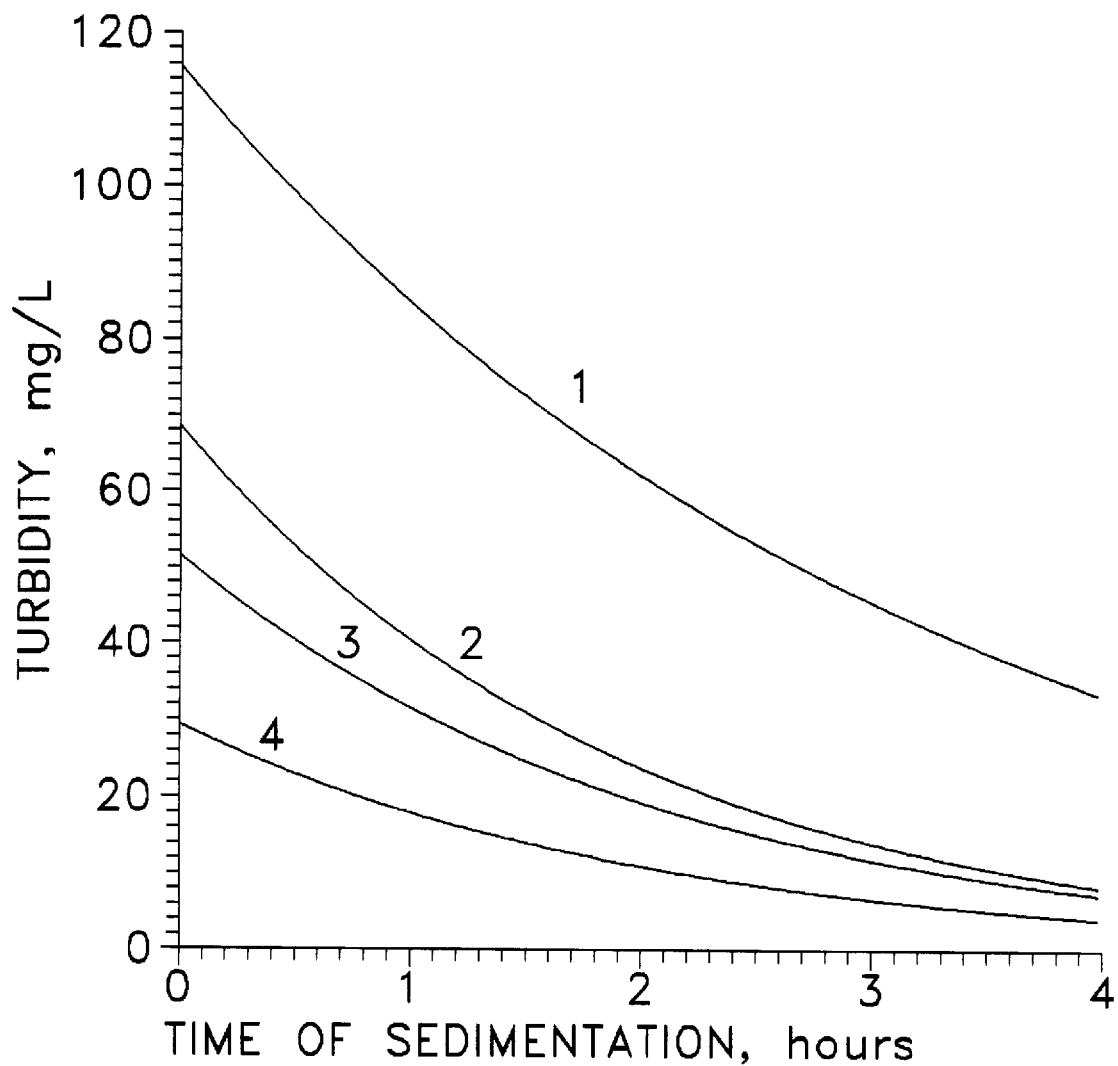
FIG. 3 is a chart which illustrates the results of comparative testing of water treatment with an FEA, using (1) aluminum sulfate obtained from aluminum powder waste containing 70% aluminum oxide, (2) aluminum sulfate obtained from aluminum hydroxide, (3) aluminum pentahydroxychloride obtained from aluminum powder waste containing 70% aluminum oxide, and (4) aluminum pentahydroxychloride obtained from aluminum hydroxide.

A standard jar test method is used for comparative testing of suspended solids sedimentation process. Artificial raw water is prepared with the 200 mg/L bentonite suspension. Coagulating agents and polyacrylamide FEA available under the trademarks "MAGNIFLOC" and "SUPERFLOC" in various countries are used with the dosage of 1.7 mg-eqv/L. FIG. 3 is a chart which illustrates the results of comparative testing of water treatment using (1) aluminum sulfate obtained from aluminum powder waste containing 70% aluminum oxide, (2) aluminum sulfate obtained from aluminum hydroxide, (3) aluminum pentahydroxychloride obtained from aluminum powder waste contained 70% aluminum oxide, (4) and aluminum pentahydroxychloride obtained from aluminum hydroxide. It is clear that the efficiency of water treatment using the coagulation and flocculation agent of the present invention is about 1.5 to 2 times or more higher than that for aluminum sulfate.

TEST 3

Figure 4:
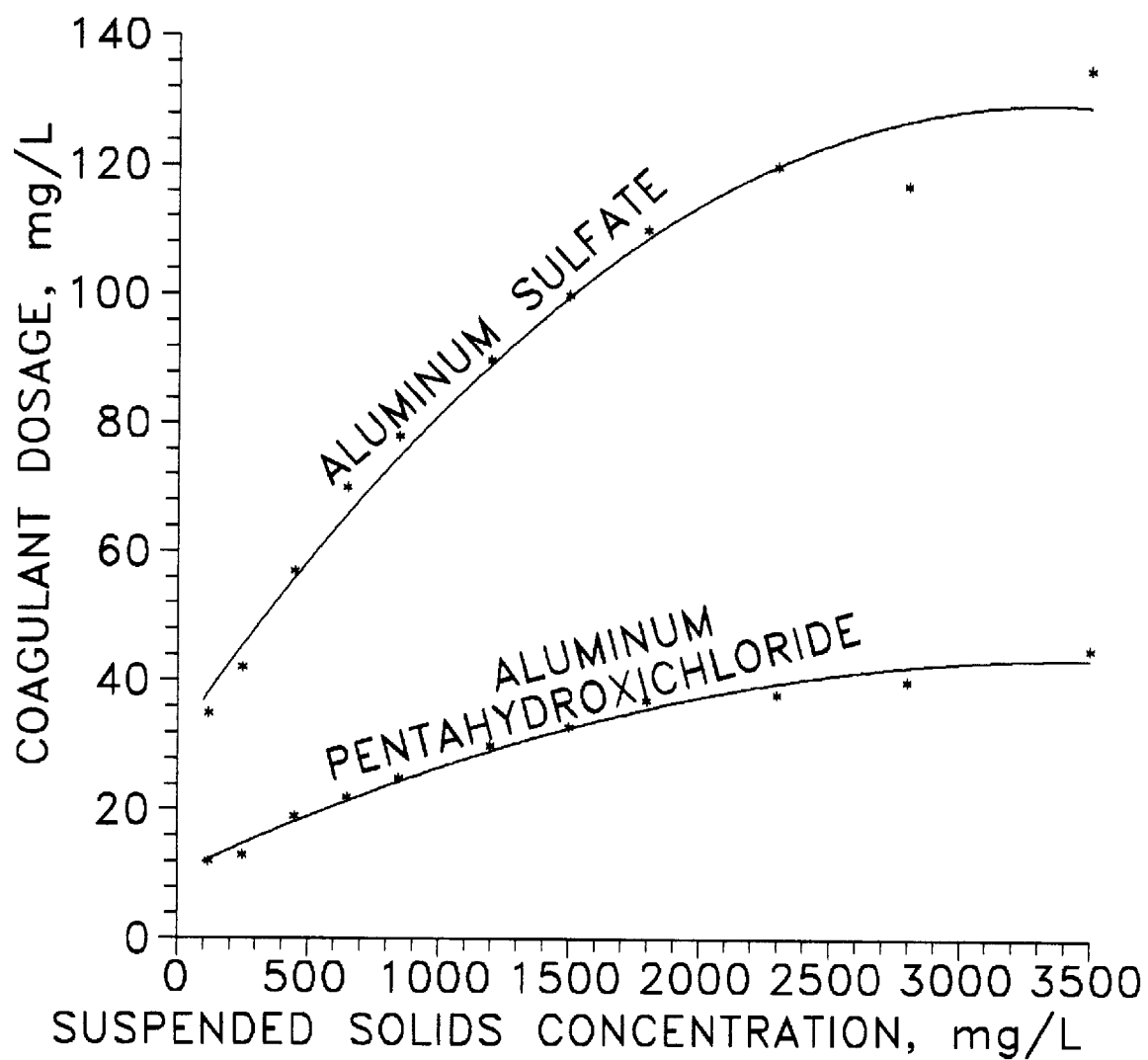
FIG. 4 is a chart which illustrates the results of comparative testing of reagent dosage for treating water using aluminum sulfate, and the proposed coagulation and flocculation agent which contains aluminum pentahydroxychloride and zeolite.

A standard test of the sedimentation process kinetics using standard 1-L cylinders is conducted to compare the coagulant dosage required to obtain 80% efficiency for the 2-hour period of time of sedimentation with the two coagulation means: 1) aluminum sulfate, and 2) the proposed coagulation and flocculation agent. The dosages are calculated by dehydrated material. FIG. 4 graphically illustrates the results of this test as coagulant dosage vs. suspended solids concentration. It is clear that the required dosage of the proposed coagulation and flocculation agent is 2–3 times lower than that for aluminum sulfate.

In the above examples each of synthetic zeolite, montmorillonite and polyacrylamide based organic synthetic flocculants can be used as FEA in place of or combined with zeolite. Similar coagulating and flocculating agents are obtained.

The examples and tests are shown with the purpose of illustration. Alternatives and modifications will be understood by those skilled in the art.

We claim:

1. A method for making a coagulating and flocculating agent consisting essentially of aluminum pentahydroxychloride and inorganic or organic flocculation enhancing additive selected from the group consisting of an aluminosilicate and polyacrylamide based synthetic organic material in a weight range of said aluminum pentahydroxychloride to the total of said flocculating enhancing additive of about 100:1 to about 100:5, wherein said aluminum pentahydroxychloride is produced by treating a natural nepheline ore, aluminum powder or aluminum oxide with a concentration of about 20% to about 25% of hydrochloric acid at a temperature of about 95° C. to about 98° C. for a period of about 7–15 minutes and is then mixed with said flocculation enhancing additive in said weight ratio.

2. The method claimed in claim 1 wherein said flocculation enhancing additive is an aluminosilicate selected from the group consisting of natural zeolite, synthetic zeolite and bentonite.

3. The method claimed in claim 2 wherein said aluminosilicate is powdered natural zeolite.

4. The method claimed in claim 2 wherein said aluminosilicate is synthetic zeolite.

5. The method claimed in claim wherein said aluminosilicate is bentonite.

6. The method claimed in claim 1 wherein said weight ratio is about 100:1.

7. The method claimed in claim 1 wherein said acid is hydrochloric acid in concentration of about 20% to about 25%, said temperature is about 95° C.

8. The method claimed in claim 7 wherein said concentration of hydrochloric acid is about 21% to about 22%.

9. The method claimed in claim 8 wherein said concentration of hydrochloric acid is about 22%, and said temperature is about 95° C.

10. A coagulating and flocculating agent consisting essentially of aluminum pentahydroxychloride and inorganic or organic flocculation enhancing additive selected from the group consisting of an aluminosilicate and polyacrylamide based synthetic organic material prepared by a method wherein said aluminum pentahydroxychloride is produced by treating a natural nepheline ore, aluminum powder or aluminum oxide with a concentration of about 20% to about 25% of hydrochloric acid at a temperature in the range of about 95° C. to about 98° C. for a process residence time of about 7 to about 15 minutes and is then mixed with said flocculation enhancing additive, wherein the weight ratio of said aluminum pentahydroxychloride to the total of said flocculation enhancing additive is about 100:1 to about 100:5.

* * * * *